(12) United States Patent
Wang

(10) Patent No.: US 10,133,029 B2
(45) Date of Patent: Nov. 20, 2018

(54) LENS AND LIGHT SOURCE APPARATUS

(71) Applicants: Cal-Comp Electronics & Communications Company Limited, New Taipei (TW); Kinpo Electronics, Inc., New Taipei (TW)

(72) Inventor: Chun-Min Wang, New Taipei (TW)

(73) Assignees: Cal-Comp Electronics & Communications Company, New Taipei (TW); Kinpo Electronics, Inc., New Taipei (TW)

( * ) Notice: Subject to any disclaimer, the term of this patent is extended or adjusted under 35 U.S.C. 154(b) by 550 days.

(21) Appl. No.: 15/007,227

(22) Filed: Jan. 27, 2016

(65) Prior Publication Data

US 2017/0184276 A1 Jun. 29, 2017

(30) Foreign Application Priority Data

Dec. 24, 2015 (TW) .............................. 104143557 A

(51) Int. Cl.
| | |
|---|---|
| *F21V 5/04* | (2006.01) |
| *G02B 13/00* | (2006.01) |
| *F21Y 115/10* | (2016.01) |
| *F21V 7/00* | (2006.01) |

(52) U.S. Cl.
CPC ................ *G02B 13/00* (2013.01); *F21V 5/04* (2013.01); *F21V 7/0091* (2013.01); *F21Y 2115/10* (2016.08)

(58) Field of Classification Search
CPC ........ F21Y 2115/10; F21V 5/04; F21V 5/046; F21V 5/045; F21V 7/0091; G02B 13/00; H01L 33/60; F21K 9/00
See application file for complete search history.

(56) References Cited

U.S. PATENT DOCUMENTS

| 8,348,475 | B2 * | 1/2013 | Wilcox | F21V 5/008 |
| | | | | 362/311.02 |
| 9,175,607 | B2 * | 11/2015 | Welch | B64D 29/00 |
| 9,410,674 | B2 * | 8/2016 | Goldstein | F21V 5/08 |
| 9,541,257 | B2 * | 1/2017 | Castillo | F21V 13/04 |
| 2009/0052192 | A1 * | 2/2009 | Kokubo | F21V 5/048 |
| | | | | 362/311.09 |

* cited by examiner

*Primary Examiner* — Peggy Neils
(74) *Attorney, Agent, or Firm* — JCIPRNET

(57) ABSTRACT

A lens including a first set of cavity regions, a second set of cavity regions and a third set of cavity regions is provided. The first set of cavity regions includes a first cavity region and a second cavity region, and a first reflection curved surface of the first cavity region faces a second reflection curved surface of the second cavity region. The second set of cavity regions includes a third cavity region and a fourth cavity region, and a third reflection curved surface of the third cavity region faces a first reflecting plane of the fourth cavity region. The third set of cavity regions includes a fifth cavity region and a sixth cavity region, and the first reflecting plane faces a refraction curved surface of the fifth cavity region and a refraction plane of the sixth cavity region. A light source apparatus is also provided.

16 Claims, 6 Drawing Sheets

LENS AND LIGHT SOURCE APPARATUS

CROSS-REFERENCE TO RELATED APPLICATION

This application claims the priority benefit of Taiwan application serial no. 104143557, filed on Dec. 24, 2015. The entirety of the above-mentioned patent application is hereby incorporated by reference herein and made a part of this specification.

BACKGROUND OF THE INVENTION

1. Field of the Invention

The present invention generally relates to optical device and optical apparatus, in particular, to a lens and a light source apparatus.

2. Description of Related Art

As the development in optical technology, more and more the light shapes of light source apparatus for providing illumination has been developed. For the light emitting device in the light source apparatus, such as light emitting die or filament, the variations of the illuminating light shape as provided are relatively few. To provide more probabilities for the light shape, the technology for the lens with various proper shapes and configured on the light path of the light emitting device to provide the proper light shape has been the concerning issue for development in the field of illumination.

In recent years, the light emitting efficiency and the lifetime of the light emitting diode (LED) has been improved. In addition, it has the device properties of low power consumption, low contamination, high efficiency, high response rate, small volume, light, capability of configuring on various surfaces, and so on. The LED has been applied to various optical fields with great intention. Generally, the LED can be applied to various illumination devices in the daily life and various flat displaying apparatus, such as the light source for the liquid crystal display (LCD). Since the LED has the properties of small volume, long life time, low power consumption as stated above, the system performance of the backlight module can be effectively improved if the LED is applied in the backlight module.

However, the LED is a light source having a direction for emitting light, so the region with direct illumination in front of the LED light source usually has relatively high luminance and the luminance at the region without direct illumination is less than the luminance at the region with direct illumination. When the LED light source is applied to the backlight module, the luminance uniformity within the effective illumination region would be affected, and the image quality of the display would be then affected.

SUMMARY OF THE INVENTION

The invention provides a lens, which can increase the divergent angle of the light source.

The invention provides a light source apparatus, which has a large divergent angle of light.

A lens in the invention has an optical axis and an incident surface. A light beam enters the lens through the incident surface. The light beam includes a first sub-light beam entering the lens with a first included angle with respect to the optical axis, a second sub-light beam entering the lens with a second included angle with respect to the optical axis, a third sub-light beam entering the lens with a third included angle with respect to the optical axis. The third included angle is greater than the second included angle, and the second included angle is greater than the first included angle. The lens comprises a first set of cavity regions, a second set of cavity regions and a third set of cavity regions. The first set of cavity regions comprises a first reflection curved surface and a second reflection curved surface, facing to each other. The second set of cavity regions comprises a third reflection curved surface and a first reflecting plane, facing to each other. The third set of cavity regions comprises a refraction curved surface and a refraction plane, in which the first reflecting plane respectively faces to the refraction curved surface and the refraction plane. The first sub-light beam is sequentially transmitting through the incident surface and transmitting through the lens after total reflection by the first reflection curved surface and the second reflection curved surface. The second sub-light beam is sequentially transmitting through the incident surface, totally reflected by the third reflection curved surface, totally reflected by the first reflecting plane, and then transmitting through the lens after refraction by the refraction plane. The third sub-light beam transmits through the incident surface and transmits through the lens after refraction by the refraction curved surface.

A light source apparatus in the invention comprises the foregoing lens and a light emitting device. The light emitting device emits the foregoing light beam.

In an embodiment of the invention, the first set of cavity regions comprises a first cavity region having the first reflection curved surface and a second cavity region having the second reflection curved surface. The second set of cavity regions comprises a third cavity region having the third reflection curved surface and a fourth cavity region having the first reflecting plane. The third set of cavity regions comprises a fifth cavity region having a refraction curved surface and a sixth cavity region having a refraction plane. The first set of cavity regions, second set of cavity regions and third set of cavity regions are axial symmetry with respect to the optical axis.

In an embodiment of the invention, the first set of cavity regions comprise a first cavity region having a first reflection curved surface and a second cavity region having a second reflection curved surface. The second set of cavity regions comprises a third cavity region having the third reflection curved surface and a fourth cavity region having the reflecting plane. The third set of cavity regions comprises a fifth cavity region having the refraction curved surface and a sixth cavity region having a refraction plane. The first set of cavity regions, the second set of cavity regions and the third set of cavity regions are axial symmetry with respect to the optical axis. The light emitting device is configured on the optical axis.

In an embodiment of the invention, the first included angle is in an angle range of 0°-30°. The second included angle is in an angle range of 30°-60°. The third included angle is in an angle range of 60°-80°.

In an embodiment of the invention, the optical axis passes the first cavity region. A ratio of a distance between an edge of the first cavity region and the optical axis of the lens to a distance between an edge of the lens and the optical axis of the lens is within a range of 0.35-0.45. The ratios of the distances between a top and a bottom of the first cavity region and a bottom of the lens to a maximum height of the lens are respectively in the ranges of 0.8-0.9 and 0.6-0.75.

In an embodiment of the invention, the ratios of the distances between both ends of the second cavity region and the optical axis of the lens to the distance between the edge of the lens and the optical axis of the lens are respectively in the ranges of 0.35-0.45 and 0.6-0.75. The ratios of the distances between a top and a bottom of the second cavity region and a bottom of the lens to a maximum height of the lens are respectively in the ranges of 0.6-0.75 and 0.5-0.65.

In an embodiment of the invention, the ratios of the distances between both ends of the second cavity region and the optical axis of the lens to the distance between the edge of the lens and the optical axis of the lens are respectively in the ranges of 0.35-0.45 and 0.6-0.75. The ratios of the distances between a top and a bottom of the second cavity region and a bottom of the lens to a maximum height of the lens are respectively in the ranges of 0.6-0.75 and 0.5-0.65.

In an embodiment of the invention, the ratios of the distances between both ends of the third cavity region and the optical axis of the lens to the distance between the edge of the lens and the optical axis of the lens are respectively in the ranges of 0.14-0.22 and 0.35-0.45. The ratios of the distances between a top and a bottom of the third cavity region and a bottom of the lens to a maximum height of the lens are respectively in the ranges of 0.37-0.47 and 0.25-0.35.

In an embodiment of the invention, the ratios of the distances between both ends of the fourth cavity region and the optical axis of the lens to the distance between the edge of the lens and the optical axis of the lens are respectively in the ranges of 0.35-0.45 and 0.83-0.93. The ratios of the distances between a top and a bottom of the fourth cavity region and a bottom of the lens to a maximum height of the lens are respectively in the ranges of 0.05-0.2 and 0.03-0.08.

In an embodiment of the invention, the ratios of the distances between both ends of the third set of cavity regions and the optical axis of the lens to the distance between the edge of the lens and the optical axis of the lens are respectively in the ranges of 0.45-0.6 and 0.9-0.99. The ratios of the distances between a top and a bottom of the third set of cavity regions and a bottom of the lens to a maximum height of the lens are respectively in the ranges of 0.4-0.55 and 0.05-0.2.

As to the foregoing descriptions, the light source apparatus of the embodiments in the invention can increase the emitting angle at the side of the light source apparatus based on the configuration of the cavity region in the lens and then has large light divergent angle. A better uniformity for the distribution of light energy as a whole can be achieved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
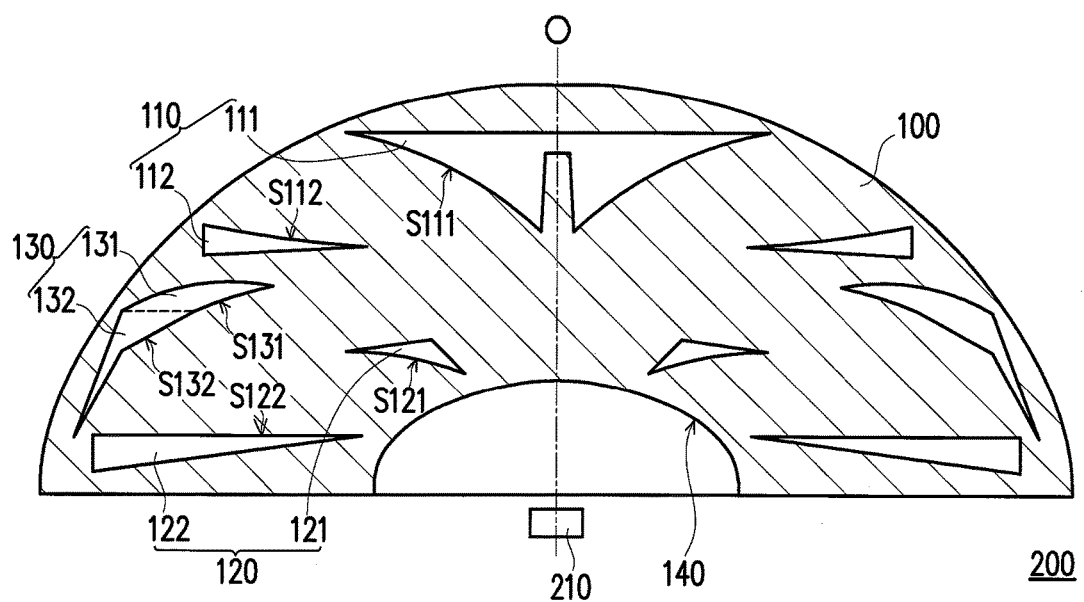
FIG. 1 is a drawing, schematically illustrating the structure of a light source apparatus, according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
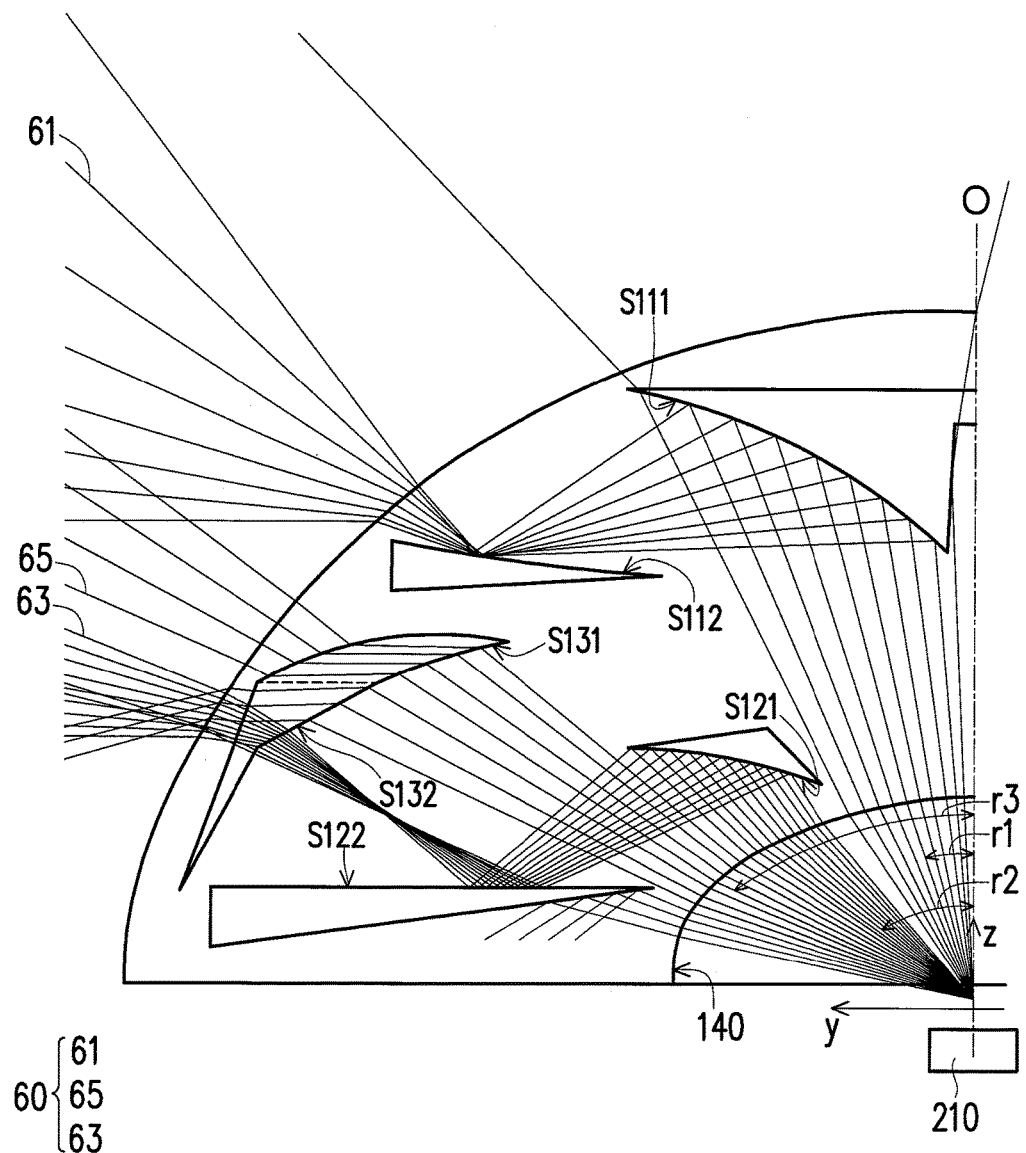
FIG. 2 is a drawing, schematically illustrating the light path of the light source apparatus in FIG. 1, according to an embodiment of the invention.

FIG. 1 is a drawing, schematically illustrating the structure of a light source apparatus, according to an embodiment of the invention. FIG. 2 is a drawing, schematically illustrating the light path of the light source apparatus in FIG. 1, according to an embodiment of the invention. Referring to FIG. 1, in an embodiment, the light source apparatus 200 comprises a lens 100 and a light emitting device 210. In addition, the shape of the lens 100 in an embodiment can be hemispherical as an example. The material of the lens 100 can be polycarbonate (PC), as an example, which can be fabricated by a fabrication method, such as the three dimensional printing method. The light emitting device 210 can be the light emitting diode as an example, but the invention is not limited to this example.

In detail for the embodiment, the lens 100 includes an optical axis O, an incident surface 140, a first set of cavity regions 110, a second set of cavity regions 120 and a third set of cavity regions 130. The first set of cavity regions includes a first reflection curved surface S111 and a second reflection curved surface S112, facing to each other. The second set of cavity regions includes a third reflection curved surface S121 and a first reflecting plane S122, facing to each other. The third set of cavity regions 130 includes a refraction curved surface S131 and a refraction plane S132, wherein the first reflecting plane S122 respectively faces to the refraction curved surface S131 and the refraction plane S132. In detail, as shown in FIG. 1, the first set of cavity regions includes a first cavity region 111 having the first reflection curved surface S111 and a second cavity region 112 having the second reflection curved surface S122. The second set of cavity regions 120 includes a third cavity region 121 having the third reflection curved surface S121 and a fourth cavity region 122 having the first reflecting plane S122. The third set of cavity regions 130 includes a fifth cavity region 131 having the refraction curved surface and a sixth cavity region 132 having the refraction plane. In addition, the first set of cavity regions 110, the second set of cavity regions 120 and the third set of cavity regions 130 are axial symmetry with respect to the optical axis O. The light emitting device 210 is configured on the optical path O. Further, in an embodiment, the cavity region can be the air as an example. The invention is not limited to this.

Furthermore, as shown in FIG. 1 and FIG. 2 in an embodiment, when the light emitting device 210 is emitting light, a light beam 60 can be emitted from the light emitting device 210. In an embodiment, because the light emitting device 210 has directional light, the light beam 60 would travel up and enter the lens 100 through the incident surface 140. In detail, the light beam 60 includes a first sub-light beam 61, a second sub-light beam 63 and a third sub-light beam 65 entering the lens 100 by different angles. In detail, the first sub-light beam 61 enters the lens 100 with a first included angle γ1 with respect to the optical axis O, the second sub-light beam 63 enters the lens 100 with a second included angle γ2 with respect to the optical axis O, and the third sub-light beam 65 enters the lens 100 with a third included angle γ3 with respect to the optical axis O. The third included angle γ3 is greater than the second included angle γ2 and the second included angle γ2 is greater than the first included angle γ1. As an example in an embodiment, the first included angle γ1 is in an angle range of 0°-30°, the second included angle γ2 is in an angle range of 30°-60°, the third included angle γ3 is in an angle range of 60°-80°. Remarkably, the numerical ranges here are just taken as the examples for describing the invention but not for limiting the invention.

Further detail in an embodiment, since the first sub-light beam 61, the second sub-light beam 63 and the third sub-light beam 65 enter the lens 100 by different angles, the first sub-light beam 61, the second sub-light beam 63 and the third sub-light beam 65 would emit out from the lens 100 at different positions due to the effects of reflection and refraction when passing the different sets of cavity regions in the lens 100. The following descriptions would also refer to FIGS. 3A-3C.

Figure 3A:
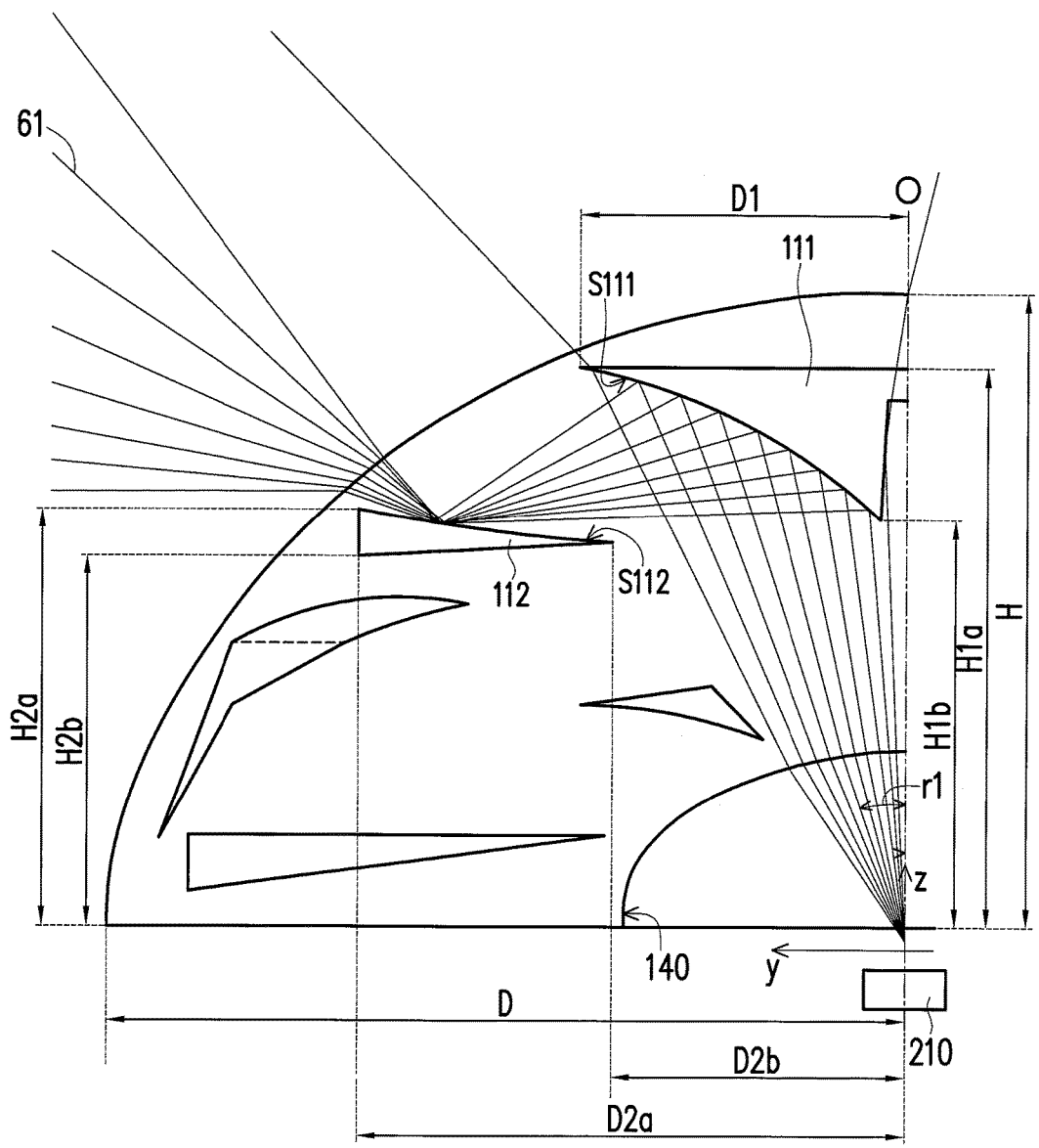
FIG. 3A to FIG. 3C are drawings, schematically illustrating the light path of lights by different angles in FIG. 2, according to an embodiment of the invention.
Figure 3B:
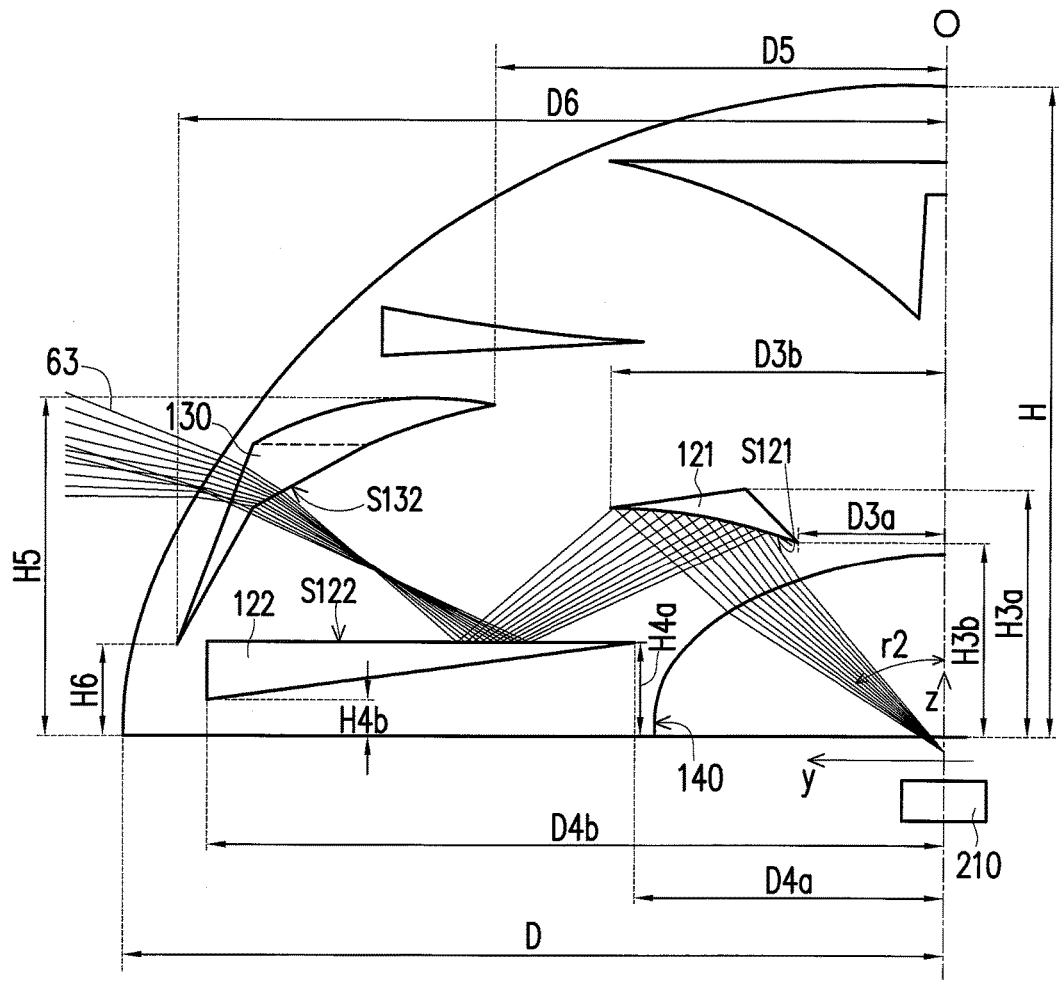
Figure 3C:
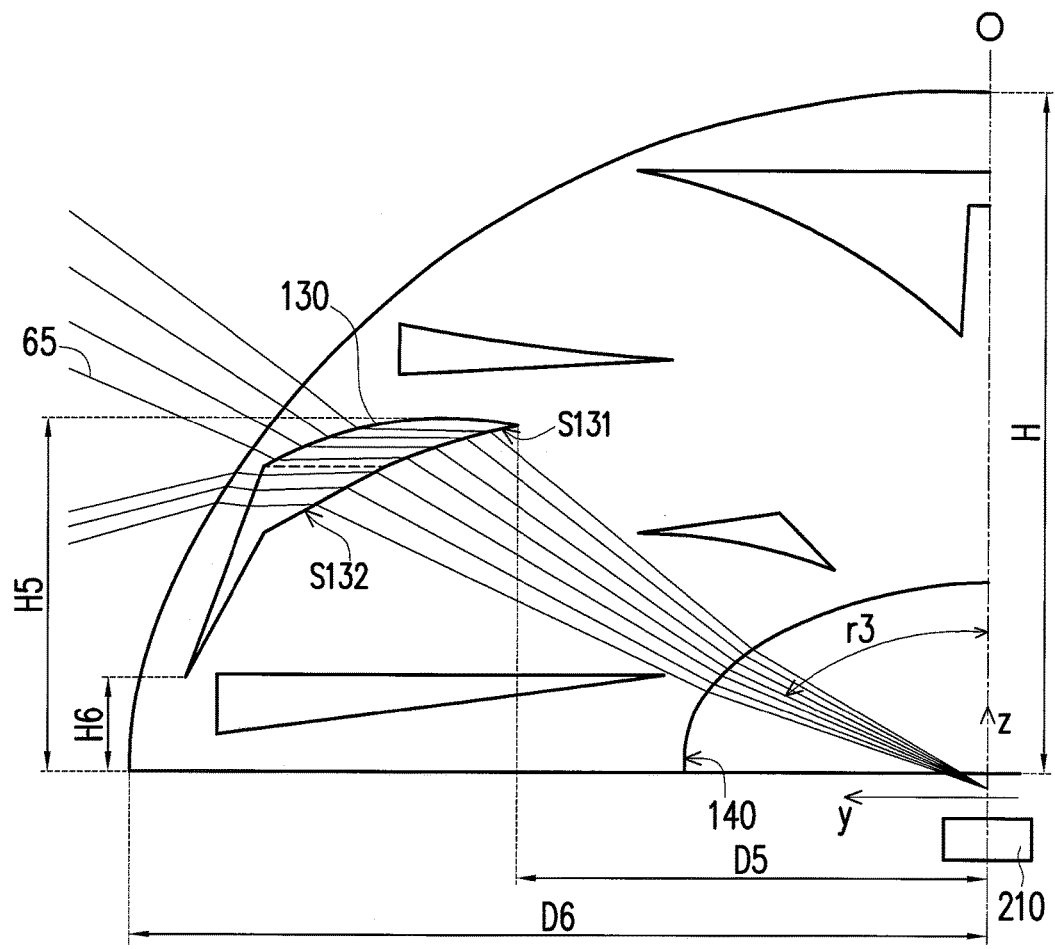

FIG. 3A to FIG. 3C are drawings, schematically illustrating the light path of lights by different angles in FIG. 2, according to an embodiment of the invention. As an example in an embodiment, referring to FIG. 1 and FIG. 3A, the optical axis O passes through the first cavity region 111 of the first set of cavity regions 110. A ratio of a distance D1 between an edge of the first cavity region 111 and the optical axis O of the lens 100 to a distance D between an edge of the lens 100 and the optical axis O of the lens 100 is in a range of 0.35-0.45, and the ratios of distances H1a and H1b between a top and a bottom of the first cavity region 111 and a bottom of the lens 100 to a maximum height H of the lens 100 are respectively in ranges of 0.8-0.9 and 0.6-0.75. On the other hand, the ratios of distances D2b and D2a between both ends of the second cavity region 112 and the optical axis O of the lens 100 to a distance D between an edge of the lens 100 and the optical axis O of the lens 100 are respectively in ranges of 0.35-0.45 and 0.6-0.75, and the ratios of distances H2a and H2b between a top and a bottom of the second cavity region 112 and a bottom of the lens 100 to a maximum height H of the lens 100 are respectively in ranges of 0.6-0.75 and 0.5-0.65. Remarkably, the numerical ranges here are just taken as the examples for describing the invention but not for limiting the invention. Thus, the first sub-light beam 61 with smaller angle, that is, the first included angle γ1, being incident to the lens 100 is sequentially transmitting through the incident surface 140 and transmitting through the lens 100 after total reflection by the first reflection curved surface S111 and the second reflection curved surface S112.

On the other hand, as shown in FIG. 1 and FIG. 3B, the ratios of distances D3a and D3b between both ends of the third cavity region 121 of the second set of cavity regions 120 and the optical axis O of the lens 100 to a distance D between an edge of the lens 100 and the optical axis O of the lens 100 are respectively in ranges of 0.14-0.22 and 0.37-0.47. The ratios of distances H3a and H3b between a top and a bottom of the third cavity region 121 and a bottom of the lens 100 to a maximum height H of the lens 100 are respectively in ranges of 0.35-0.45 and 0.25-0.35. The ratios of distances D4a and D4b between both ends of the fourth cavity region 122 and the optical axis O of the lens 100 to a distance D between an edge of the lens 100 and the optical axis O of the lens 100 are respectively in ranges of 0.35-0.45 and 0.83-0.93. The ratios of distances H4b and H4a between a top and a bottom of the fourth cavity region 122 and a bottom of the lens 100 to a maximum height H of the lens 100 are respectively in ranges of 0.05-0.2 and 0.03-0.08. In addition, in an embodiment as shown in FIG. 1 and FIG. 3C, the ratios of distances D5 and D6 between both ends of the third set of cavity regions 130 and the optical axis O of the lens 100 to a distance D between an edge of the lens 100 and the optical axis O of the lens 100 are respectively in ranges of 0.45-0.6 and 0.9-0.99. The ratios of distances H5 and H6 between a top and a bottom of the third set of cavity regions 130 and a bottom of the lens 100 to a maximum height H of the lens 100 are respectively in ranges of 0.4-0.55 and 0.05-0.2. Remarkably, the numerical ranges here are just taken as the examples for describing the invention but not for limiting the invention.

In an embodiment, the distance D between the edge of the lens 100 and the optical axis O of the lens 100 is 14.2 mm as an example. The maximum height H of the lens 100 is 11.2 mm as an example. The distance D1 between an edge of the first cavity region 111 and the optical axis O of the lens 100 is in a range of 5 mm-6 mm, as an example. The distances H1a and H1b between a top and a bottom of the first cavity region 111 and a bottom of the lens 100 are respectively in ranges of 9 mm-10 mm and 7 mm-8 mm, as an example. The distances D2a and D2b between both ends of the second cavity region 112 and the optical axis O of the lens 100 are respectively in ranges of 9 mm-10 mm and 5 mm-6 mm, as an example. The distances H2a and H2b between a top and a bottom of the second cavity region 112 and a bottom of the lens 100 are respectively in ranges of 7 mm-8 mm and 6 mm-7 mm, as an example, in which the distance H2a is greater than the distance H2b. Remarkably, the numerical ranges here are just taken as the examples for describing the invention but not for limiting the invention.

In an embodiment, the distances D3a and D3b between both ends of the third cavity region 121 and the optical axis O of the lens 100 are respectively in ranges of 2 mm-3 mm and 5.5 mm-6.5 mm, as an example. The distances H3a and H3b between a top and a bottom of the third cavity region 121 and a bottom of the lens 100 are respectively in ranges of 4 mm-5 mm and 3 mm-4 mm, as an example, in which the distance H3a is greater than the distance H3b. The distances D4a and D4b between both ends of the fourth cavity region 122 and the optical axis O of the lens 100 are respectively in ranges of 5 mm-6 mm and 12 mm-13 mm, as an example. The distances H4b and H4a between a top and a bottom of the fourth cavity region 122 and a bottom of the lens 100 are respectively in ranges of 0.4 mm-0.8 mm and 1 mm-2 mm, as an example. The distances D5 and D6 between both ends of the third set of cavity regions 130 and the optical axis O of the lens 100 are respectively in ranges of 7 mm-8 mm and 13 mm-14 mm, as an example. The distances H5 and H6 between a top and a bottom of the third set of cavity regions 130 and a bottom of the lens 100 are respectively in ranges of 5 mm-6 mm and 1 mm-2 mm, as an example. Remarkably, the numerical ranges here are just taken as the examples for describing the invention but not for limiting the invention.

Thus, the second sub-light beam 63 with a medium angle, that is, the second included angle γ2, being incident to the lens 100 is sequentially transmitting through the incident surface 140, totally reflected by the third reflection curved surface S121, totally reflected by the first reflecting plane S122, and then transmitting through the lens 100 after refraction by the refraction plane S132 of the sixth cavity region 132. On the other hand, the third sub-light beam 65 with a large angle, that is, the third included angle γ3, being incident to the lens 100 transmits through the incident surface 140 and then transmits through the lens 100 after refraction by the refraction curved surface S131 of the fifth cavity region 131.

As a result shown in FIG. 3A to FIG. 3C, the light source apparatus 200 can use the lens 100 with configuration of different sets of cavity regions and then cause the first sub-light beam 61, the second sub-light beam 63, and the third sub-light beam 65 to emit out with angles toward the side of the light source apparatus 200, so the divergent angle of the light beam 60 can be increased and a better uniformity for the distribution of light energy as a whole can be achieved.

Figure 4:
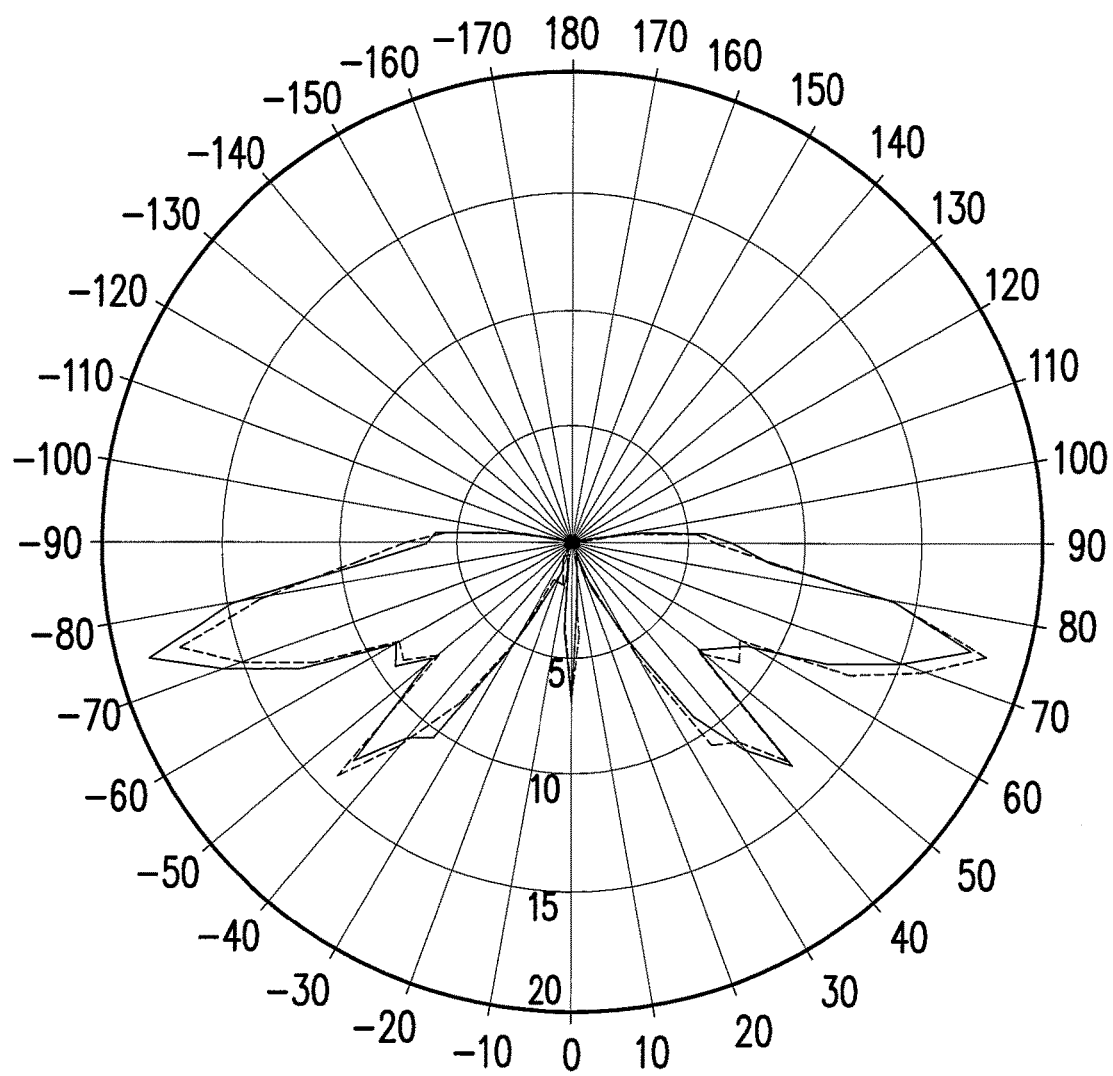
FIG. 4 is a drawing, schematically illustrating the light shape of the light source apparatus in FIG. 1, according to an embodiment of the invention.

FIG. 4 is a drawing, schematically illustrating the light shape of the light source apparatus in FIG. 1, according to an embodiment of the invention. In FIG. 4, the direction at 0 degree is corresponding to an upward direction along the optical axis O in FIG. 1. The direction of +90 degrees is corresponding to a rightward direction perpendicular to the optical axis O in FIG. 1. The direction of −90 degrees is corresponding to a leftward direction perpendicular to the optical axis O in FIG. 2. The radial direction is corresponding to the luminous intensity. The luminous intensity is greater when farther away the center of circle. As shown in FIG. 4, in an embodiment, the light source apparatus 200 has a large divergent angle of light and a better uniformity for the distribution of light energy as a whole. In detail, for an embodiment as shown in FIG. 4, the light shape of the light source apparatus 200 is mainly distributed in a range from 20° to 110° and a range from −20° to −110°. Remarkably, the numerical ranges here are just taken as the examples for describing the invention but not for limiting the invention.

As to the foregoing descriptions, the light source apparatus of embodiments in the invention using the lens with configuration of cavity regions inside can increase the emitting angle toward the side of the light source apparatus 200, so it has a large divergent angle of the light beam and can achieve a better uniformity for the distribution of light energy as a whole.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lens, having an optical axis and an incident surface, a light beam entering the lens through the incident surface, the light beam comprising a first sub-light beam entering the lens with a first included angle with respect to the optical axis, a second sub-light beam entering the lens with a second included angle with respect to the optical axis, a third sub-light beam entering the lens with a third included angle with respect to the optical axis, wherein the third included angle is greater than the second included angle and the second included angle is greater than the first included angle, the lens comprising:
   a first set of cavity regions, comprising a first reflection curved surface and a second reflection curved surface, facing to each other;
   a second set of cavity regions, comprising a third reflection curved surface and a first reflecting plane, facing to each other; and
   a third set of cavity regions, comprising a refraction curved surface and a refraction plane, wherein the first reflecting plane respectively faces to the refraction curved surface and the refraction plane,
   wherein the first sub-light beam is sequentially transmitting through the incident surface and transmitting through the lens after total reflection by the first reflection curved surface and the second reflection curved surface,
   wherein the second sub-light beam is sequentially transmitting through the incident surface, totally reflected by the third reflection curved surface, totally reflected by the first reflecting plane, and then transmitting through the lens after refraction by the refraction plane,
   wherein the third sub-light beam transmits through the incident surface and transmits through the lens after refraction by the refraction curved surface.

2. The lens as recited in claim 1, wherein the first set of cavity regions comprises a first cavity region having the first reflection curved surface and a second cavity region having the second reflection curved surface, the second set of cavity regions comprises a third cavity region having the third reflection curved surface and a fourth cavity region having the first reflecting plane, the third set of cavity regions comprises a fifth cavity region having the refraction curved surface and a sixth cavity region having the refraction plane, wherein the first set of cavity regions, the second set of cavity regions and the third set of cavity regions are axial symmetry with respect to the optical axis.

3. The lens as recited in claim 2, wherein the optical axis passes the first cavity region, a ratio of a distance between an edge of the first cavity region and the optical axis of the lens to a distance between an edge of the lens and the optical axis of the lens is within a range of 0.35-0.45, and ratios of distances between a top and a bottom of the first cavity region and a bottom of the lens to a maximum height of the lens are respectively in ranges of 0.8-0.9 and 0.6-0.75.

4. The lens as recited in claim 2, wherein ratios of distances between both ends of the second cavity region and the optical axis of the lens to a distance between an edge of the lens and the optical axis of the lens are respectively in ranges of 0.35-0.45 and 0.6-0.75, and ratios of distances between a top and a bottom of the second cavity region and a bottom of the lens to a maximum height of the lens are respectively in ranges of 0.6-0.75 and 0.5-0.65.

5. The lens as recited in claim 2, wherein ratios of distances between both ends of the third cavity region and the optical axis of the lens to a distance between an edge of the lens and the optical axis of the lens are respectively in ranges of 0.14-0.22 and 0.37-0.47, ratios of distances between a top and a bottom of the third cavity region and a bottom of the lens to a maximum height of the lens are respectively in ranges of 0.35-0.45 and 0.25-0.35.

6. The lens as recited in claim 2, wherein ratios of distances between both ends of the fourth cavity region and the optical axis of the lens to a distance between an edge of the lens and the optical axis of the lens are respectively in ranges of 0.35-0.45 and 0.83-0.93, ratios of distances between a top and a bottom of the fourth cavity region and a bottom of the lens to a maximum height of the lens are respectively in ranges of 0.05-0.2 and 0.03-0.08.

7. The lens as recited in claim 2, wherein ratios of distances between both ends of the third set of cavity regions and the optical axis of the lens to a distance between an edge of the lens and the optical axis of the lens are respectively in ranges of 0.45-0.6 and 0.9-0.99, and ratios of distances between a top and a bottom of the third set of cavity regions and a bottom of the lens to a maximum height of the lens are respectively in ranges of 0.4-0.55 and 0.05-0.2.

8. The lens as recited in claim 1, wherein the first included angle is in an angle range of 0°-30°, the second included angle is in an angle range of 30°-60°, the third included angle is in an angle range of 60°-80°.

9. A light source apparatus, comprising:
   a lens, having an optical axis and an incident surface, comprising:

a first set of cavity regions, comprising a first reflection curved surface and a second reflection curved surface, facing to each other;
a second set of cavity regions, comprising a third reflection curved surface and a first reflecting plane, facing to each other; and
a third set of cavity regions, comprising a refraction curved surface and a refraction plane, wherein the first reflecting plane respectively faces to the refraction curved surface and the refraction plane; and
a light emitting device, emitting a light beam, wherein light beam enters the lens through the incident surface, the light beam comprises a first sub-light beam entering the lens with a first included angle with respect to the optical axis, a second sub-light beam entering the lens with a second included angle with respect to the optical axis, a third sub-light beam entering the lens with a third included angle with respect to the optical axis, wherein the third included angle is greater than the second included angle and the second included angle is greater than the first included angle,
wherein the first sub-light beam is sequentially transmitting through the incident surface and transmitting through the lens after total reflection by the first reflection curved surface and the second reflection curved surface,
wherein the second sub-light beam is sequentially transmitting through the incident surface, totally reflected by the third reflection curved surface, totally reflected by the first reflecting plane, and then transmitting through the lens after refraction by the refraction plane,
wherein the third sub-light beam transmits through the incident surface and transmits through the lens after refraction by the refraction curved surface.

10. The light source apparatus as recited in claim 9, wherein the first set of cavity regions comprises a first cavity region having the first reflection curved surface and a second cavity region having the second reflection curved surface, the second set of cavity regions comprises a third cavity region having the third reflection curved surface and a fourth cavity region having the first reflecting plane, the third set of cavity regions comprises a fifth cavity region having the refraction curved surface and a sixth cavity region having the refraction plane, wherein the first set of cavity regions, the second set of cavity regions and the third set of cavity regions are axial symmetry with respect to the optical axis.

11. The light source apparatus as recited in claim 9, the first included angle is in an angle range of 0°-30°, the second included angle is in an angle range of 30°-60°, the third included angle is in an angle range of 60°-80°.

12. The light source apparatus as recited in claim 10, wherein the optical axis passes the first cavity region, a ratio of a distance between an edge of the first cavity region and the optical axis of the lens to a distance between an edge of the lens and the optical axis of the lens is within a range of 0.35-0.45, and ratios of distances between a top and a bottom of the first cavity region and a bottom of the lens to a maximum height of the lens are respectively in ranges of 0.8-0.9 and 0.6-0.75.

13. The light source apparatus as recited in claim 10, wherein ratios of distances between both ends of the second cavity region and the optical axis of the lens to a distance between an edge of the lens and the optical axis of the lens are respectively in ranges of 0.35-0.45 and 0.6-0.75, and ratios of distances between a top and a bottom of the second cavity region and a bottom of the lens to a maximum height of the lens are respectively in ranges of 0.6-0.75 and 0.5-0.65.

14. The light source apparatus as recited in claim 10, wherein ratios of distances between both ends of the third cavity region and the optical axis of the lens to a distance between an edge of the lens and the optical axis of the lens are respectively in ranges of 0.14-0.22 and 0.37-0.47, ratios of distances between a top and a bottom of the third cavity region and a bottom of the lens to a maximum height of the lens are respectively in ranges of 0.35-0.45 and 0.25-0.35.

15. The light source apparatus as recited in claim 10, wherein ratios of distances between both ends of the fourth cavity region and the optical axis of the lens to a distance between an edge of the lens and the optical axis of the lens are respectively in ranges of 0.35-0.45 and 0.83-0.93, ratios of distances between a top and a bottom of the fourth cavity region and a bottom of the lens to a maximum height of the lens are respectively in ranges of 0.05-0.2 and 0.03-0.08.

16. The light source apparatus as recited in claim 10, wherein ratios of distances between both ends of the third set of cavity regions and the optical axis of the lens to a distance between an edge of the lens and the optical axis of the lens are respectively in ranges of 0.45-0.6 and 0.9-0.99, and ratios of distances between a top and a bottom of the third set of cavity regions and a bottom of the lens to a maximum height of the lens are respectively in ranges of 0.4-0.55 and 0.05-0.2.

* * * * *